April 26, 1955  S. G. JOHNSON  2,706,859
PIVOTALLY CONTRACTIBLE PLUG GAGE
Filed Sept. 16, 1952
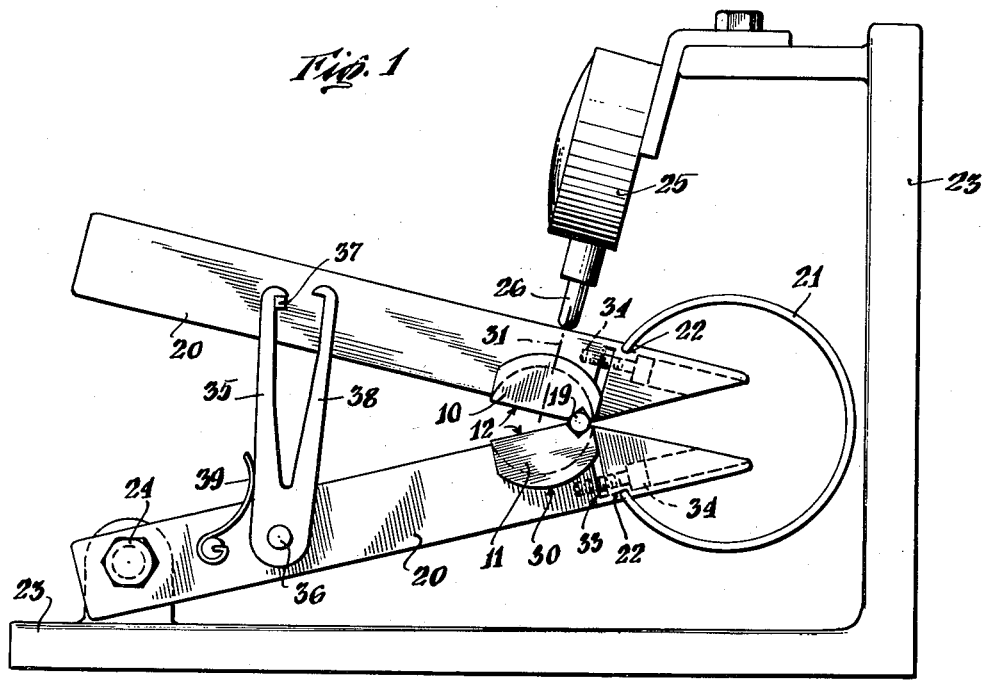
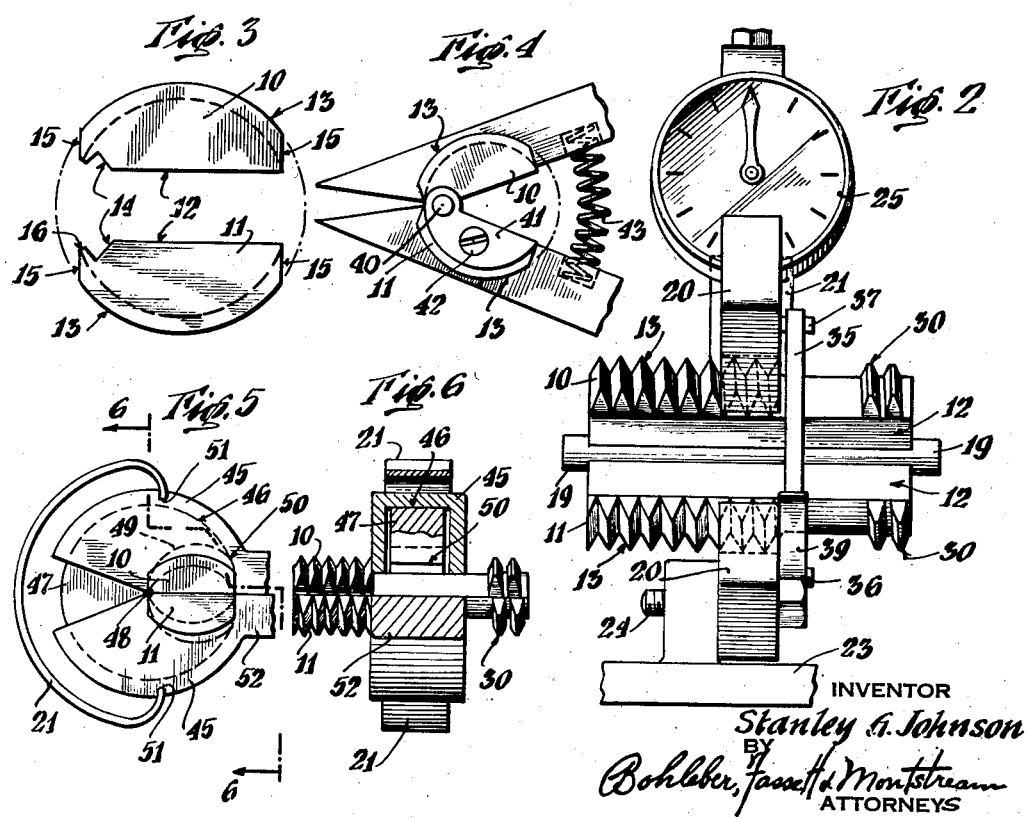
INVENTOR
Stanley G. Johnson
BY
Bohleber, Jacoby & Montstream
ATTORNEYS

United States Patent Office 2,706,859
Patented Apr. 26, 1955

2,706,859

PIVOTALLY CONTRACTIBLE PLUG GAGE

Stanley G. Johnson, West Hartford, Conn., assignor, by mesne assignments, to The Johnson Gage Development Company, a corporation of Connecticut Application September 16, 1952, Serial No. 309,820

11 Claims. (Cl. 33—178)

The invention relates to a plug or internal gage of the contractile and expansible type and is suitable for gaging internal plain cylindrical surfaces, grooves and screw threads. The gage includes two members each having a gaging surface, the cross section of which is less than a semicircle, and mounted for pivotal movement on a longitudinal axis which lies within the gaging surfaces and adjacent the periphery. Either both gaging means pivot or one pivots with respect to the other. The gage in its preferred form is inexpensive to manufacture yet is effective in gaging internal surfaces or holes.

It is an object of the invention to construct a new and novel plug or internal gage which is expansible and contractible for insertion within a hole to be gaged, gaging the internal surface and removing of the gage from the hole.

Another object of the invention is to construct a plug or internal gage of two gaging members one of which pivots with respect to the other or both pivot, the pivot being located interiorly or within boundaries formed by the gaging surfaces or their extension and carried by the gaging members and extending longitudinally thereof and adjacent to the gaging surface or surfaces.

A still further object is to construct a plug or internal gage as in the preceding object in which each gage member carries a pivot groove in the chordal surface thereof and a pin within the grooves forms the pivot means.

Another object is to construct a go and not-go plug gage having two gaging members which pivot in contracting and expanding and in which the pivot is located within the boundaries of the gaging surfaces and the extension thereof.

Other objects of the invention will be more apparent from the following description when taken in connection with the accompanying drawings illustrating a preferred embodiment thereof in which:

Figure 1 is a side elevation of the gage in expanded relation;

Figure 2 is a front view of the gage looking into the open side thereof;

Figure 3 is an end view of the gaging members in concentric spaced relation;

Figure 4 illustrates a gage with a different form of pivot means;

Figure 5 is a side view of another form of gage having pivot means at one end only of the gaging surfaces and of a large size; and Figure 6 is a front view of the gage of Figure 5.

The gage includes a pair of cooperating gaging members 10 and 11, the outer surface of which is arcuate and forms the gaging surface. The gaging surface 13 may be such as to gage the depth of a groove, may be plain surfaced, either cylindrical or taper, or may be screw threaded, as particularly shown, and either cylindrical or taper threaded. The gaging members are less than semi-cylindrical or less than semicircular in cross section and have chordal surfaces 12.

Pivot means pivotally supports or mounts the gaging members, that shown in Figures 1 and 3 including a groove 14 extending longitudinally in the chordal surface 12 of at least one gaging member although preferably a groove is provided in each gaging member. The grooves are parallel with the axis of the gaging surface. The groove particularly illustrated is a V groove although it may be any desirable shape. The groove preferably is as close as possible to the gaging surface and for a screw thread its most desired location is with its edge closely adjacent to the minimum or root circle of the screw thread. Each edge 15 of each gaging surface having a screw threaded gaging surface is cut away to the roots of the screw thread in parallel planes for added clearance in removing the gage from a test threaded hole and if desired to provide gripping surfaces.

A desirable way to make the gaging members for a screw threaded plug gage is to accurately form a screw thread on a piece of solid round stock and mill opposite parallel sides to the root diameter of the thread to form the flat parallel surfaces 15. This screw threaded piece is then cut in half such as by milling and the central area is milled out having a width approximately three times the radial depth of the thread measured from the outer diameter to the root diameter and is represented by the space between chords 12 of Figure 3. If the central area removed has a greater width, this reduces the gaging surfaces 13 and a lesser width reduces the amount of maximum contraction of the gaging members and reduces the clearance of the gage in contracted position for ease in removal from the threaded hole of a test part. For a plain surfaced gage there is no need to provide the surfaces 15 or to have the center area, milled away, to be so wide. The groove 14 is milled or otherwise formed in the chordal surface.

The pivot means for the gaging members includes the grooves 14 forming bearings and a pivot such as a pin which may be desirably about 1/10 the diameter of the gage. The grooves 14 are dimensioned to support the pivot or pin 19 so that the gaging members may pivot thereon. It is clear that there is a considerable range of diameters of pins which may be used for this pivot; however, greater pivoting movement is secured when the pin is small relatively to the diameter of the gage members. The pivot pin is a simple straight pin or wire. A part of the back edge 16 may also be removed to provide pivoting clearance at this back edge; however, it should not be high enough to remove the point of contact of this side of the groove with the pivot pin. The grooves are adjacent to the gaging surface or spaced from the center of the chordal surface of the gaging members. With the grooves in the gaging members the latter provide their own bearing for the pivot means and the bearing has a length coextensive with the gaging members. Each gaging member supports and gives rigidity to the other.

Each gage member is secured to an arm or lever 20 in any suitable manner so that the gaging members 10 and 11 project therefrom. The grooves 14 are preferably located so that the pivot or pivot pin 19 is tangent to the minimum gaging circle which for a screw thread is the root circle. Means are provided to press the gaging members onto the pivot and to hold the gage in assembled relation, the means particularly illustrated being a spring means shown as a C spring 21, each end of which rests in a slot 22 in an arm 20. The slots 22 are located adjacent the pivot pin 19 and preferably so that the pressure of the spring pivots the gaging members to open or expanded position. The arms 20 and the spring 21 constitute means for opening and closing the gaging members. The spring also has the additional function in a construction using grooves 14 or half bearings of holding the gaging members together.

The gage may be a hand gage if desired. It also may be mounted to form a comparator gage in which case one of the arms may be secured to a frame or base 23 such as by a bolt 24. An indicator shown as a dial indicator 25 is also carried by the frame and the contact pin 26 thereof engages the movable upper arm 20. By locating the indicator so that its operating point engages the arm 20 farther away from the gaging members an amplified reading may be secured which increases the accuracy of the gage. By having the indicator point engage the arm 20 on the line 31, no amplification of the reading is secured.

The gage is used by pressing the two handles together which closes the gaging members with the chordal surfaces in contact or substantial contact whereupon the internal thread to be gaged is slipped over the end of the gaging members or the gage is inserted in the test hole. Upon releasing of the handles the spring 21 opens the gaging members until they contact the internal surface to be gaged. The indicator thereupon indicates whether or not the internal surface is within the allowed tolerances and is acceptable. The gage is then closed and the test part removed.

It will be observed that it is the spring pressure of the spring 21 which holds the two gaging members 10 and 11 pivotally together on the pivot 19. This bearing is shown as a free pin in that it can slide axially in the grooves 14. The pivot may be two or more balls (not shown). The gaging members have free axial movement with respect to each other sliding longitudinally on the pivot pin. The gages therefore, automatically adjust themselves laterally with respect to a screw thread when this is the type of internal surface which is to be gaged. It is clear that the pivot if desired may be secured to or be a part of one gaging member in which case the bearing or groove 14 carried by the other member constitutes the cooperating part of the pivot means.

The gaging members may extend on both sides of the arms 20 as appears in Figure 2 in which case the gage may serve to give overall acceptability of an internal test thread and the pitch diameter thereof. On one side the thread or gaging surface 13 may be a full thread to provide a go gage and on the other end the gaging surface 30 may have one or two truncated threads engaging at the pitch diameter and provide a not-go gage. The not-go portion may have a larger diameter by one or more thousandths of an inch than that of the go gaging surface depending upon the tolerance limits between the go and not-go dimension.

Instead of having the two gaging members of different diameters they may be of the same diameter in which case the two ends may be made at the same time, as one thread. For a comparator gage using an indicator 25, the dial limits may be set in a position different from those of the go-gage side in recognition of the fact that the two gage surfaces are of the same pitch diameter. The gage may be used as a hand gage by removing the bolt 24 and releasing the gage from the base 23. Stop means is then provided for both the go and the not-go diameter when the pitch diameters are the same in order to enable the not-go gage to open to a greater extent. This means may take many forms that shown being a ratchet means including a pawl 35 pivoted on a pin 36 carried by one arm 20 and engaging a stop or ratchet 37 carried by the other arm. A second pawl 38 secured to the pawl 35 is slightly longer than the latter and is moved into engagement with the ratchet 37 when the not-go gaging means 30 is used. A spring 39 may project the pawl 35 into contact with ratchet 37. The longer ratchet 38 allows the gaging means 30 to open outwardly a greater distance by one or more thousandths of an inch depending upon the difference in length of the two pawls and the magnification secured because the pawls are farther away from the pivot pin 19 than the gaging surfaces. When the gage is to be used as a comparator with a dial indicator, the pawl is removed from the pin 36.

In sensing the gage the three wire system with micrometer can be used. In other words expensive master rings are not necessary which is the present practice. In fact the type of comparator shown in the Johnson Patent 2,432,160 can be used to set the plug gage by first setting the comparator with a master plug which is standard equipment with this type of comparator and then set the expansible plug gate with this comparator. The gage may also be used to gage tapered surfaces either plain, grooved or threaded in which the side face of arms 20 may serve as the axial stop for gaging position.

The gaging members 10 and 11 may be secured to the arms 20 in any suitable fashion. The securing means shown includes a slit 33 in each arm to provide flexibility and a screw 34 then clamps the arm against the flat faces 15 of the gaging member.

In Figure 4 the gaging members have a pivot means of a hinge form including a pivot pin 40 secured at each end of one gaging member and a bearing plate 41 secured such as by a screw 42 to each end of the other gaging member with sufficient clearance to permit relative longitudinal movement between the gaging members. With this pivot means one member may carry a pin at one end and a bearing plate at the other end and it is not necessary that both pins be carried by the same member. The gaging members are held together by the hinge type of pivot means and the pivot means is of such size that no part extends beyond boundaries formed by the gaging surfaces. A test part may therefore be inserted over the end of the gaging members. A spring 43 may be provided to propel the gaging members to expanded position.

Any form of pivot or hinge means may be used at the outer end of the gaging members so long as the pivot means lies within the boundaries of the gaging surface and any extension thereof beyond the ends of the surfaces. When the pivot means extends to the end of the gage member then it is of such size that the test part may be inserted over the end of the gaging members. The pivot means of Figures 1 to 3 is particularly desirable from a manufacturing and assembly standpoint because of its ease of manufacture and assembly; however, other forms may be used.

Figures 5 and 6 show a gage in which the pivot means is not confined within the boundaries formed by the gaging surface. The axis of the pivot means, however, does lie within the boundaries. With the constructions of Figures 5 and 6 the pivot axis may be located at the boundary surface. In this construction the gage members 10 and 11 are the same as those provided in Figures 1 through 4 excepting the bearing grooves are not provided. The gaging member 10 is secured to a bearing member 45 having a bearing surface 46 which is less than a semicircle in cross section. The gaging member 11 is likewise secured to a like bearing member 45.

The two bearing members are mounted upon opposite sides of a cylindrical pivot 47 which is in the form of a disk upon which the bearing surfaces 46 ride to pivotally mount the two gaging members 10 and 11 on the pivot axis 48 which is shown in line with the root of the threaded gaging members although it may be spaced therefrom within the gaging surfaces. The bearing 46 is longer or of greater extent than the pivot 47 so that the gaging members may have longitudinal movement with respect to each other. The pivot 47 is provided with a recess 49 which may have an opening 50 in the side wall thereof. So constructed the bearing member 45 and its gaging member may be removed from the pivot.

A C-shaped spring 21 may retain the bearing members 45 and their gaging members on the pivot 47 and yet permit pivotal movement between the gaging members. This spring is retained in position by slots 51 in the outer periphery of the bearing member which slots are located to the right as seen in Figure 5 with respect to the pivot axis 48. So positioned the spring 21 keeps the gaging members closed when closed and when opened the ends of the C spring pass to the left of the pivot axis to hold the gaging members open when they are in open position. Each bearing member may be provided with a handle 52. It will be observed therefore that the pivot means need not extend to the ends of the gaging members nor does the bearing need be provided in the chordal surface of the gaging means; also the pivot means 45, 47 may have a radial dimension greater than that of the gaging surfaces.

The gages illustrated have handles to close or contract the gaging members and a spring to open or expand the gaging members. The handles and the spring comprise means to expand and contract the gaging members and are the preferred form of means. In the pivot means of Figure 1, the grooves 14 and in the pivot means of Figure 5, the bearing surfaces 46 provide half bearings or bearings less than a semicircle so that normally the gage members would fall away from their respective pivots 19 and 47. The C spring retains the gaging members together as well as providing means to expand the gaging members. An arm of the gages shown in Figures 4 and 5 may have a hole to receive the bolt 24 to mount the same on the base or frame 23 for use as a comparator gage.

The constructions described are suitable for use as laps as well as gages.

The invention is presented to fill a need for improvements in a pivotally contractible plug gage. It is understood that various modifications in structure, as well as changes in mode of operation, assembly and manner of use, may and often do occur to those skilled in the art, especially after benefitting from the teachings of an invention. Hence, it will be understood that this disclosure is illustrative of preferred means of embodying the invention in useful form by explaining the construction, operation and advantages thereof.

What is claimed is:

1. A pivotally contractible plug gage comprising a pair of gaging members each having an arcuate external gaging surface with an axis at the center of the arcuate gaging surface, each gaging member being less than a semicircle in cross section, pivot means carried by the gaging members to pivotally mount the gaging members and having its axis extending parallel to the axes of the gaging surfaces, the pivot means axis being within boundaries formed by the gaging surfaces and located adjacent to the gaging surfaces, and means to expand and contract the gaging members.

2. A pivotally contractible plug gage comprising a pair of gaging members each having an arcuate external gaging surface with an axis at the center of the arcuate gaging surface, each gaging member being less than a semicircle in cross section, means carried by the gaging members to pivotally retain the gaging members together including pivot means to pivotally mount the gaging members the axis of which pivot means extends parallel to the axes of the gaging surfaces, the pivot means axis being within boundaries formed by the gaging surfaces and located adjacent to the gaging surfaces, and means to expand and contract the gaging members.

3. A pivotally contractible plug gage comprising a pair of gaging members each having an arcuate external gaging surface with an axis at the center of the arcuate gaging surface, each gaging member being less than a semicircle in cross section, pivot means carried by the gaging members to pivotally mount the gaging members and having its axis extending parallel to the axes of the gaging surfaces, the pivot means being of such size that it lies within boundaries formed by the gaging surfaces and located adjacent to the gaging surfaces, and means to expand and contract the gaging members.

4. A pivotally contractible plug gage comprising a pair of gaging members each having an arcuate external gaging surface with an axis at the center of the arcuate gaging surface, each gaging member being less than a semicircle in cross section, pivot means for the gaging members to pivotally mount the same including half bearings carried by each gaging member and a pivot, the axis of the pivot means extending parallel to the axes of the gaging surfaces, the pivot means axis being within boundaries formed by the gaging surfaces and located adjacent to the gaging surfaces,; and spring means retaining the gaging members in assembled relation.

5. A pivotally contractible plug gage comprising a pair of gaging members each having an arcuate external gaging surface with an axis at the center of the arcuate gaging surface, each gaging member being less than a semicircle in cross section and having a chordal surface, pivot means to pivotally mount the gaging members including a groove in the chordal surface of each gaging member extending parallel to the axes of the gaging surfaces and adjacent to the gaging surfaces, means received in the grooves upon which the gaging members pivot to expand and contract the gaging members, means retaining the gaging members in assembled relation, and means to expand and contract the gaging members.

6. A pivotally contractible plug gage comprising a pair of gaging members each having an arcuate external gaging surface, with an axis at the center of the arcuate gaging surface, each gaging member being less than a semicircle in cross section and having a chordal surface, and pivot means to pivotally mount the gaging members including a groove in the chordal surface of each gaging member extending parallel to the axes of the gaging surfaces and adjacent to the gaging surfaces, means received in the grooves upon which the gaging members pivot, spring means retaining the gage members in assembled relation and propelling the gaging members to expanded position, and lever means secured to each gaging member.

7. A pivotally contractible plug gage comparator comprising a pair of gaging members each having an arcuate external gaging surface with an axis at the center of the arcuate gaging surface, each gaging member being less than a semicircle in cross section, pivot means carried by the gaging members to pivotally mount the gaging members the axis of which pivot means extends parallel to the axes of the gaging surfaces, the pivot means axis being within boundaries formed by the gaging surfaces and located adjacent to the gaging surfaces, means to expand the gaging members, a frame, an arm carried by each gaging member, one of the arms being secured to the frame, and an indicator carried by the frame and engaging the other arm.

8. A pivotally contractible plug gage comparator comprising a pair of gaging members each having an arcuate external gaging surface with an axis at the center of the arcuate gaging surface, each gaging member being less than a semicircle in cross section and having a chordal surface; pivot means carried by the gaging members to pivotally mount the gaging members including a longitudinal groove in the chordal surface of each gaging member extending parallel to the axes of the gaging surfaces and within boundaries formed by the gaging surfaces and located adjacent to the gaging surfaces, and a pivot pin received in the grooves; means retaining the gaging members in assembled relation, a frame, an arm carried by each gaging member, one of the arms being secured to the frame, and an indicator engaging the other arm.

9. A pivotally contractible plug gage comparator as in claim 8 in which the means for retaining the gaging members in assembled relation is a C shaped spring having its ends engaging the arms adjacent the pivot pin to shift the pressure of the spring to opposite sides of the pivot pin in expanded and contracted positions of the gaging members.

10. A pivotally contractible plug gage comprising a pair of gaging members each having an arcuate external gaging surface with an axis at the center of the arcuate gaging surface, each gaging member being less than a semicircle in cross section and having a chordal surface; pivot means carried by the gaging members to pivotally mount the gaging members including a bearing member secured to each gaging member at the end of the gaging surface and having a bearing surface the axis of which extends parallel to the axes of the gaging surfaces and within boundaries formed by the gaging surfaces and located adjacent to the gaging surfaces, and a cylindrical pivot receiving the bearing surfaces of the bearing members, spring means retaining the gaging members in assembled relation and expanding the same, and an arm carried by each gaging member.

11. A pivotally contractible plug gage comprising a pair of gaging members each having an arcuate external gaging surface with an axis at the center of the arcuate gaging surface, each gaging member being less than a semicircle in cross section and having a chordal surface; pivot means carried by the gaging members at the ends thereof to pivotally mount the gaging members including a pivot pin secured to one gaging member and a bearing plate secured to the other gaging member, the axis of the pivot means extending parallel to the axes of the gaging surfaces, the pivot means being within boundaries formed by the gaging surfaces and located adjacent to the gaging surfaces; spring means to expand the gaging members, and an arm carried by each gaging member.

References Cited in the file of this patent

UNITED STATES PATENTS

| | | |
|---|---|---|
| 1,274,331 | Rockwell | July 30, 1918 |
| 1,305,701 | Douglass | June 3, 1919 |
| 1,819,025 | Hartness | Aug. 18, 1931 |
| 2,557,293 | Johnson | June 19, 1951 |
| 2,588,820 | Gates et al. | Mar. 11, 1952 |
| 2,609,614 | Johnson | Sept. 9, 1952 |

FOREIGN PATENTS

| | | |
|---|---|---|
| 45,167 | Switzerland | Sept. 16, 1908 |
| 251,615 | Germany | Oct. 8, 1912 |
| 109,138 | Australia | Nov. 30, 1939 |